United States Patent
Li

(10) Patent No.: US 9,362,823 B2
(45) Date of Patent: Jun. 7, 2016

(54) SWITCH-MODE POWER SUPPLY, CHARGING CURRENT SOURCE AND ASSOCIATED METHOD

(71) Applicant: Chengdu Monolithic Power Systems Co., Ltd., Chengdu (CN)

(72) Inventor: Lei Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 195 days.

(21) Appl. No.: 14/290,591

(22) Filed: May 29, 2014

(65) Prior Publication Data

US 2014/0354256 A1 Dec. 4, 2014

(30) Foreign Application Priority Data

May 29, 2013 (CN) .......................... 2013 1 0206341

(51) Int. Cl.
*H02M 3/335* (2006.01)
*H02M 3/156* (2006.01)
*H02M 1/00* (2006.01)

(52) U.S. Cl.
CPC ...... *H02M 3/156* (2013.01); *H02M 2001/0022* (2013.01)

(58) Field of Classification Search
CPC ..... H02M 3/157; H02M 3/156; H02M 3/335; H02M 3/33523; H02M 3/33507; H02M 5/2576; H02M 7/033; G05F 1/67; G06G 7/26; Y02B 70/126
USPC .......................... 323/283, 299, 322, 351, 353; 363/21.04, 21.05, 21.07, 21.08, 21.09, 363/21.1, 21.11, 21.12, 21.13, 21.15, 21.16, 363/21.17, 21.18, 84, 95, 147
See application file for complete search history.

(56) References Cited

U.S. PATENT DOCUMENTS

| | | | | |
|---|---|---|---|---|
| 6,721,192 B1 * | 4/2004 | Yang | ................. | H02M 3/33507 363/21.11 |
| 6,839,247 B1 * | 1/2005 | Yang | ................... | H02M 1/4225 363/21.07 |
| 2013/0114310 A1 * | 5/2013 | Huang | .............. | H02M 3/33507 363/21.12 |

* cited by examiner

*Primary Examiner* — Nguyen Tran
(74) *Attorney, Agent, or Firm* — Perkins Coie LLP

(57) ABSTRACT

A switch-mode power supply includes a converter, a controller and a charging current. The charging current includes a logic circuit, a first current source and a second current source, to generate a charging current proportional to an input voltage of the switch-mode power supply, and also to generate a logic control signal indicative of either of two operation modes.

20 Claims, 7 Drawing Sheets

SWITCH-MODE POWER SUPPLY, CHARGING CURRENT SOURCE AND ASSOCIATED METHOD

CROSS-REFERENCE TO RELATED APPLICATION(S)

This application claims the benefit of CN Patent Application No. 201310206341.X, filed on May 29, 2013, and incorporated herein by reference.

TECHNICAL FIELD

The present invention generally relates to circuit, and more particularly but not exclusively to switch-mode power supply, charging current source and associated method.

BACKGROUND

In the area of power supply, switch-mode power supply with constant time control method is widely applied in the industry by means of its excellent transient performance, simple structure and smooth transition between operational modes.

Conventional constant time controller of switch-mode power supply may comprise a timer for setting an on-time or off-time. FIG. 1 illustrates a schematic circuit diagram of a timer 10 as a prior art. As shown in FIG. 1, the timer 10 comprises a charging current source 11, a charging capacitor 12, a comparator 13 and a timing switch 14. The charging current source 11 and the charging capacitor 12 are coupled in series between a power supply voltage VDD and a system reference ground GND. The timing switch 14 is connected in parallel with the charging capacitor 12. The comparator 13 is coupled to a junction between the charging current source 11 and the charging capacitor 12 with a non-inverting input terminal, and receives a reference signal VREF1 with an inverting input end. When the switching converter is under initialization, the timing switch 14 is turned off, and the charging current source 11 charges the charging capacitor 12. The voltage level on an output terminal VO begins increasing. When the output terminal VO arrives at the same level of the reference signal VREF1, the output of comparator 13 is turned to high level, and the timing switch 14 is turned on. The charging capacitor 12 is discharged thereupon. The voltage level on the output terminal VO gradually falls down to zero, and then the output of the comparator 13 is turned to low level. Thus, the time during which the charging current source 11 charges the charging capacitor 12 serves as the on-time or the off-time of the constant time controller.

As the operating frequency of the switch-mode power supply is required substantially constant, the on-time or the off-time of the switch-mode power supply should change along with an input voltage VIN of the switch-mode power supply. For example, if the input voltage VIN gets higher, the on-time should be shortened. While if the input voltage gets lower, the on-time should be prolonged. Consequently, the charging current source 11 generates a charging current that positively or inversely follows with the input voltage VIN. FIG. 2A shows a schematic circuit diagram of a variable charging current source 21 as a prior art. As shown in FIG. 2A, the charging current source 21 comprises an operational amplifier 210. A non-inverting input terminal of the operational amplifier 210 receives the input voltage VIN via a resistor R1, and an inverting input terminal of the operational amplifier 210 receives a reference signal VREF. A first metal oxide semiconductor field effect transistor (MOSFET) M1 is coupled to the non-inverting input end of the operational amplifier 210 and the reference ground GND respectively with its source terminal and drain terminal. A gate of the first MOSFET M1 is connected to an output terminal of the operational amplifier 210 to form a feedback loop. A second MOSFET M2, a third MOSFET M3 and a fourth MOSFET M4 are together comprise a current mirror, wherein a gate of the second MOSFET M2 is coupled to the output terminal of the operational amplifier 210 to receive a bias voltage for providing a reference current. Therefore, the variable current source 21 generates an output current IOUT=(VIN−VREF)/R1, i.e. that the output current IOUT is proportional to the input voltage VIN.

FIG. 2B illustrates a schematic circuit diagram of another variable charging current source 22 as a prior art. Compared with the variable charging current source 21, resistors R1 and R2 comprise a voltage divider, providing a divided input voltage (R2×VIN)/(R1+R2) to an non-inverting input terminal of an operational amplifier 220. A resistor R3 is coupled to both the first MOSFET M1 and a inverting input terminal of the operational amplifier 220 with one terminal. The other terminal of the resistor R3 is connected to the system reference ground GND. The charging current source 22 generates a charging current IOUT=(R2×VIN)/R3(R1+R2), i.e. that the output current IOUT is proportional to the input voltage VIN.

However, the prior art timer could not completely shut down the internal charging current source when the system is standby, which increases the power consumption of switch-mode power supply.

Meanwhile, the r controller may be integrated with a plurality of optional control modes for user to choose according to the occasion of application. For an instance, some controllers may allow the switch-mode power supply to work under either force continuous current mode (FCCM) or discrete current mode (DCM). Other controllers may have different control mode options, for example, an option of multi-phase output on/off. For integrated circuit (IC), it is usually required extra pins for performing mode-choosing functions, and extra pins bring a higher cost of IC.

SUMMARY

A switch-mode power supply comprising a converter, a controller and a charging current source, wherein the switch-mode power supply is configured to converter an input voltage to an output voltage, and wherein the charging current source comprises a multi-functional pin, coupled to the input voltage or a system reference ground via a first resistor, wherein a frequency signal is generated on the multi-functional pin, and an initial value of the frequency signal is generated according to the input voltage or a zero voltage on the system reference ground; a logic circuit coupled to the multi-functional pin, wherein the logic circuit generates a logic control signal according to the initial value of the frequency signal and an enable signal, and wherein the logic control signal is coupled to the controller configured to indicate either of two operation modes of the controller; a first current source coupled to the logic circuit and the multi-functional pin, wherein the first current source generates a first output current according to the frequency signal, the enable signal and the logic control signal; a second current source coupled to the logic circuit and the multi-functional pin, wherein the second current source generates a second output current according to the frequency signal, the enable signal and the logic control signal; and wherein the first output current is incorporated with the second output current to comprise a charging current provided to the controller, wherein the charging current is proportional to the input voltage.

BRIEF DESCRIPTION OF THE DRAWINGS

Non-limiting and non-exhaustive embodiments are described with reference to the following drawings. The drawings are only for illustration purpose. These drawings are not necessarily drawn to scale. The relative sizes of elements illustrated by the drawings may differ from the relative size depicted.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present technology may be practiced without these specific details. In other instances, well-known methods, procedures, components, and circuits have not been described in detail so as not to unnecessarily obscure aspects of the present invention.

Figure 1:
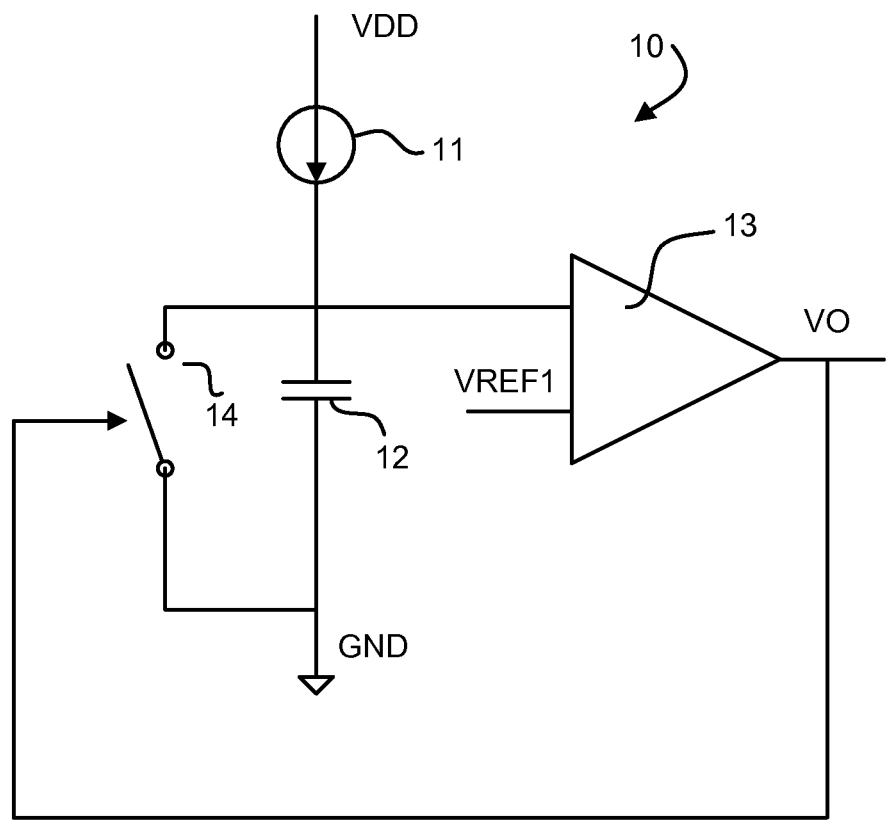
FIG. 1 illustrates a schematic circuit diagram of a timer 10 as a prior art.
Figure 2A:
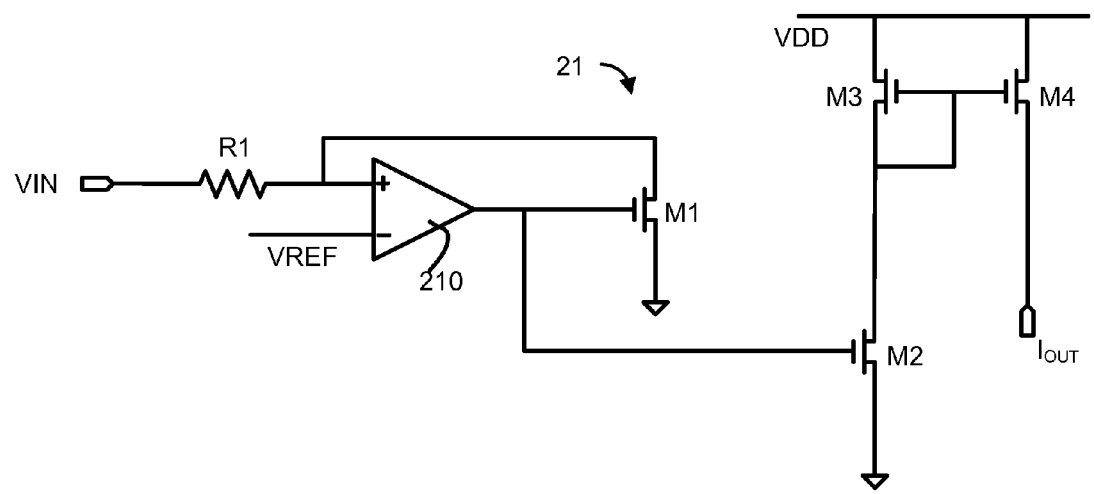
FIG. 2A illustrates a schematic circuit diagram of a variable charging current source 21 as a prior art.
Figure 2B:
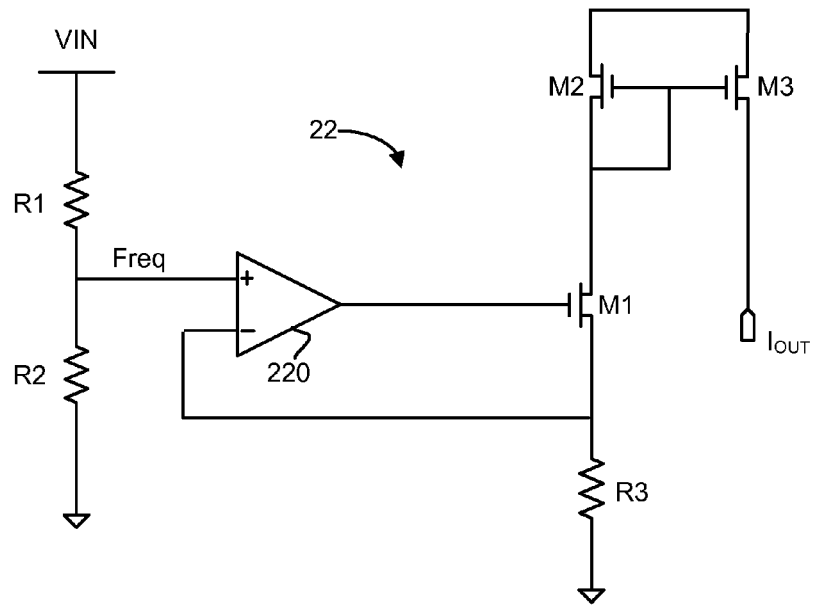
FIG. 2B illustrates a schematic circuit diagram of another variable charging current source 22 as a prior art.
Figure 3:
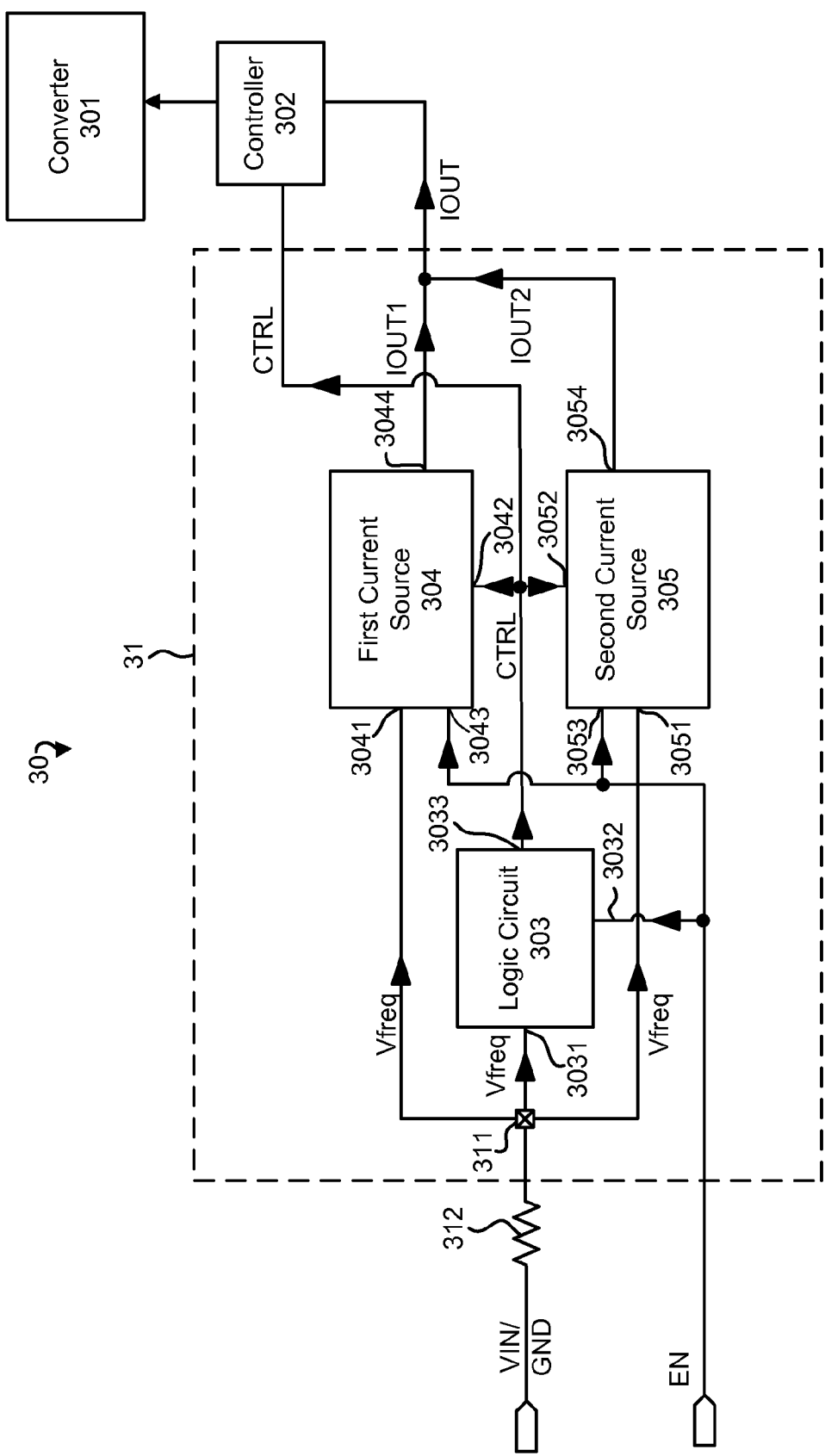
FIG. 3 illustrates a schematic block diagram of a switch mode power supply 30 according to an embodiment of the present invention.

FIG. 3 illustrates a schematic block diagram of a switch mode power supply 30 according to an embodiment of the present invention. As shown in FIG. 3, the switch mode power supply 30 comprises a converter 301, a controller 302 and a charging current source 31. The switch mode power supply 30 is configured to convert an input voltage VIN to an output voltage VOUT. The charging current 31 comprises a logic circuit 303, a first current source 304 and a second current source 305. In one embodiment, the control method of the controller 302 at least comprises constant-time control method. The logic circuit 303 has a first input terminal 3031, a second input terminal 3032, and an output terminal 3033. The first current source 304 has a first input terminal 3041, a second input terminal 3042, a third input terminal 3043 and an output terminal 3044. The second current source 305 has a first input terminal 3051, a second input terminal 3052, a third input terminal 3053 and an output terminal 3054. The switch mode power supply 30 further comprises a multi-functional pin 311 and a first resistor 312. The multi-functional pin 311 is coupled to the input voltage VIN or a system reference ground GND via the first resistor 312. The multi-function pin 311 is further coupled to the input terminal 3031 of the logic circuit 303, the first input terminal 3041 of the first current source 304, and the first input terminal 3051 of the second current source 305. A frequency signal Vfreq is generated on the multi-function pin 311. An initial value of the frequency signal Vfreq is determined by the input voltage VIN or a zero voltage on the system reference signal GND. The logic circuit 303 generates a logic control signal CTRL on the output terminal 3033 in accordance with the initial value of the frequency signal Vfreq and an enable signal EN which is provided to the second input terminal 3032 of the logic circuit 303. In the illustrated embodiment, the logic control signal CTRL is provided to the second input terminal 3042 of the first current source 304, and the second input terminal 3052 of the second current source 3052.

The enable signal EN is further provided to the third input terminal 3043 of the first current source 304 and the third input terminal 3053 of the second current source 305. In one embodiment, the logic control signal CTRL and the enable signal EN together determine the operation status of the first current source 304 and the second current source 305. The first current source 304 generates a first output current IOUT1 on the output terminal 3044 of according to the frequency signal Vfreq, the enable signal EN and the logic control signal CTRL. The second current source 305 generates a second output current IOUT2 on the output terminal 3054 according to the frequency signal Vfreq, the enable signal EN and the logic control signal CTRL. The first output current is incorporated with the second output current IOUT2 to comprise a charging current IOUT in the controller 302. The charging current IOUT is proportional to the input voltage VIN. In one embodiment, supposing the enable signal EN is at high level, when the logic control signal CTRL is also at high level, the first current source 304 is completely shut down, and the first output current IOUT is zero. The second current source 305 is in operation, and generates the second output current IOUT2 on the output terminal 3054. On the contrary, when the logic control signal CTRL is at low level, the first current source is in operation, and generates the first output current IOUT1. The second current source 305 is completely shut down, and the second output current IOUT2 is zero. Nevertheless, once the enable signal EN is at low level, despite the logic control signal CTRL, both the first current source 304 and the second current source 305 are completely shut down.

Seen in FIG. 3, the logic control signal CTRL is further provided to the controller 302, to indicate either of two operational modes of the controller 302. In one embodiment, the logic control signal CTRL is provided to the controller 302 to indicate the switch mode power supply 30 to work under forced-continuous-conduction mode (FCCM) or discontinuous-conduction mode (DCM). For example, if the logic control signal CTRL is at high level, the switch mode power supply 30 works under FCCM, while if the logic control signal CTRL is at low level, the switch mode power supply 30 works under CDM. In other embodiments, the logic control signal CTRL may indicate other type of operation modes of the switch mode power supply 30, for an instance, indicating whether the switch mode power supply 30 works under constant on-time mode, or indicating whether the switch mode power supply 30 works with multi-phase output, or indicating operational frequency range of the switch mode power supply 30.

When the first current source 304 works normally according to the logic control signal CTRL and the enable signal EN, the first input terminal 3041 is coupled to the multi-functional pin 311, and generates the first output current IOUT1 according to the frequency signal Vfreq, wherein the first output current IOUT1 relates to the input voltage VIN. In one embodiment, the multi-functional pin 311 receives the input voltage VIN via the first resistor 312. Thus the first output IOUT1 is determined by the voltage difference between the input voltage VIN and the frequency signal Vfreq. In one embodiment, the first output current IOUT1=K1×(VIN−Vfreq), where K1 is a nonzero constant. As the second current source 305 is completely shut down, IOUT2=0. As a result, the charging current IOUT=IOUT1=K1×(VIN−Vfreq), i.e. the charging current IOUT is proportional to the input voltage VIN.

When the second current source 305 works normally according to the logic control signal CTRL and the enable signal EN, the first input terminal 3051 is coupled to the multi-functional pin 311, and generates the second output current IOUT2 according to the frequency signal Vfreq, wherein the second output current IOUT2 relates to the input voltage VIN. In one embodiment, the multi-functional pin 311 is coupled to the system reference ground GND via the first resistor 312. The frequency signal Vfreq is set to be proportional to the input voltage VIN, for example, Vfreq=VIN−b, wherein b is a constant. The second output current IOUT2=K2×Vfreq=K2×(VIN−b), where K2 is a nonzero constant. As the first current source 304 is completely shut down by the logic control signal CTRL, the charging current IOUT=IOUT2=K2×(VIN−b), i.e. the charging current IOUT is in proportional to the input voltage VIN.

Figure 4:
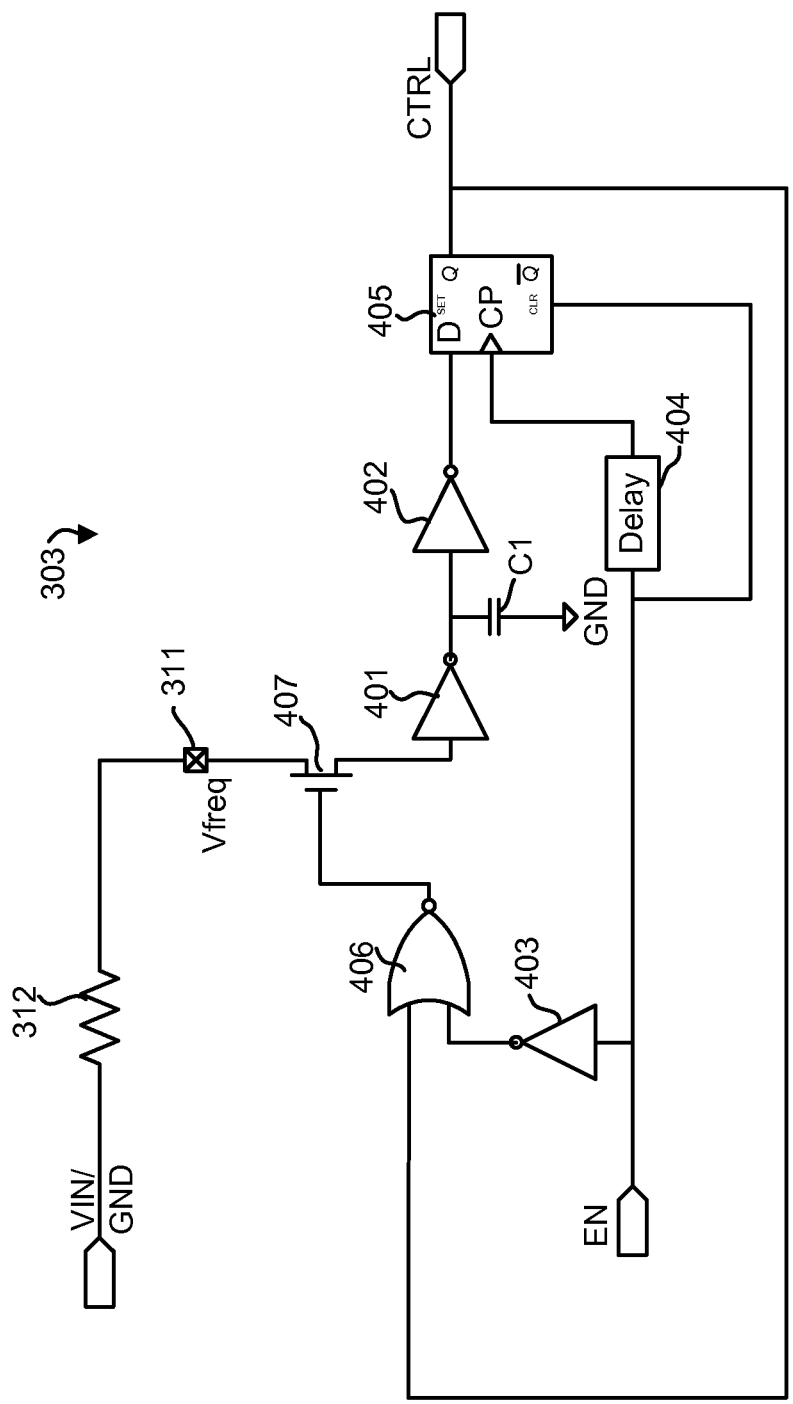
FIG. 4 illustrates a schematic circuit diagram of the logic circuit 303 according to an embodiment of the present invention.

FIG. 4 illustrates a schematic circuit diagram of the logic circuit 303 according to an embodiment of the present invention. As shown in FIG. 4, the logic circuit 303 comprises a first inverter 401, a second inverter 402, a third inverter 403, a logic capacitor C1, a delay module 404, a flip-flop 405, a NOR gate 406 and a logic switch 407. In the illustrated embodiment, the flip-flop 405 is a D-type flip-flop, having a D input terminal, a clock input terminal CP, a reset input terminal CLR, a Q output terminal and a $\overline{Q}$ output terminal. The switch 407 is a NMOS transistor. One with ordinary skill in the art should understand that in other embodiments, other types of flip-flop may serve as the flip-flop 405. For example, the flip-flop 405 may be a RS flip-flop, or a JK flip-flop. The logic switch 407 may also be replaced by other suitable circuit or device that is well known by one ordinary skilled in the art. The switch 407 is coupled between the first resistor 312 and an input terminal of the first inverter 401. An output terminal of the first inverter 401 is coupled to an input terminal of the second inverter 402. An output terminal of the second inverter 402 is coupled to the D input terminal of the flip-flop 405. The logic capacitor C1 is coupled between the output terminal of the inverter 401 and the system reference ground GND. The clock input terminal CP receives the enable signal EN via the delay module 404, and the reset input terminal CLR receives the enable signal EN directly. The Q output terminal provides the logic control signal CTRL. An input terminal of the third inverter 403 receives the enable signal EN, and an output terminal of the third inverter 403 is coupled to a first input terminal of the NOR gate 406. A second input terminal of the NOR gate 406 receives the logic control signal CTRL. An output terminal of the NOR gate 406 is coupled to a gate electrode of the switch 407 to control the switch 407 ON and OFF.

When the system is starting, the enable signal EN is at high level, and then provided to the reset input terminal CLR to reset the flip-flop 405. The logic control signal CTRL is at low level, i.e. the voltage level on the second input terminal of the NOR gate 406 is low. The enable signal EN is inverted to low level by third inverter 403 and then provided to the first input terminal of the NOR gate 406. Therefore the voltage level on both the two input terminals of NOR gate 406 is low, and the output terminal of NOR gate provides a high level signal to turn the switch 407 on. To perform a logic detecting process, the initial value of frequency signal Vfreq is provided to the input terminal of the first inverter 401 via the switch 407. If the multi-function pin 311 is coupled to the input voltage VIN via the first resistor 312, the initial value of the frequency signal Vfreq is equal to the input voltage VIN, i.e. the frequency signal Vfreq is a high level signal. The output terminal of the first inverter 401 consequently generates a low level signal. A voltage across the capacitor C1 keeps unchanged. The output terminal of the second inverter 402 provides a high level signal to the D input terminal of the flip-flop 405. While the rising edge of the enable signal EN is delayed by the delay module 404 for a period T2 before it arrives at the clock input terminal CP. The Q output terminal of the flip-flop 405 generates a high level signal as the logic control signal CTRL, and thus logic detecting is completed.

If the multi-functional pin 311 is coupled to the system reference ground GND via the first resistor 312, the initial value of the frequency signal Vfreq is low. The output terminal of the first inverter 401 provides a high level signal to charge the capacitor C1. After a period T1 (T1<T2), the voltage across the capacitor C1 is charged to high level, and therefore the output terminal of the second inverter 402 provides a low level signal to the D input terminal of flip-flop 405. While the rising edge of the enable signal EN is delayed by the delay module 404 for a period T2 before it arrives at the clock input terminal CP. The Q output terminal of the flip-flop 405 keeps providing a low level signal as the logic control signal CTRL, and thus logic detecting is completed.

One with ordinary skill in the art could understand that in other embodiments, the logic circuit 303 may have circuit structure or output result different from the above described embodiments. For an instance, in another embodiment, the logic circuit 303 may apply the $\overline{Q}$ output terminal to provide the logic control signal CTRL. In yet another embodiment, the logic circuit 303 may be without the second inverter 402, and the output terminal of the first inverter 401 is connected to the D input terminal of the flip-flop 405 directly. At this time, if the multi-functional pin 311 receives the input voltage VIN via the first resistor 312, the control signal CTRL is at low level. While if the multi-functional pin 311 is coupled to the system reference ground GND via the first resistor 312, the control signal CTRL is at high level.

Figure 5:
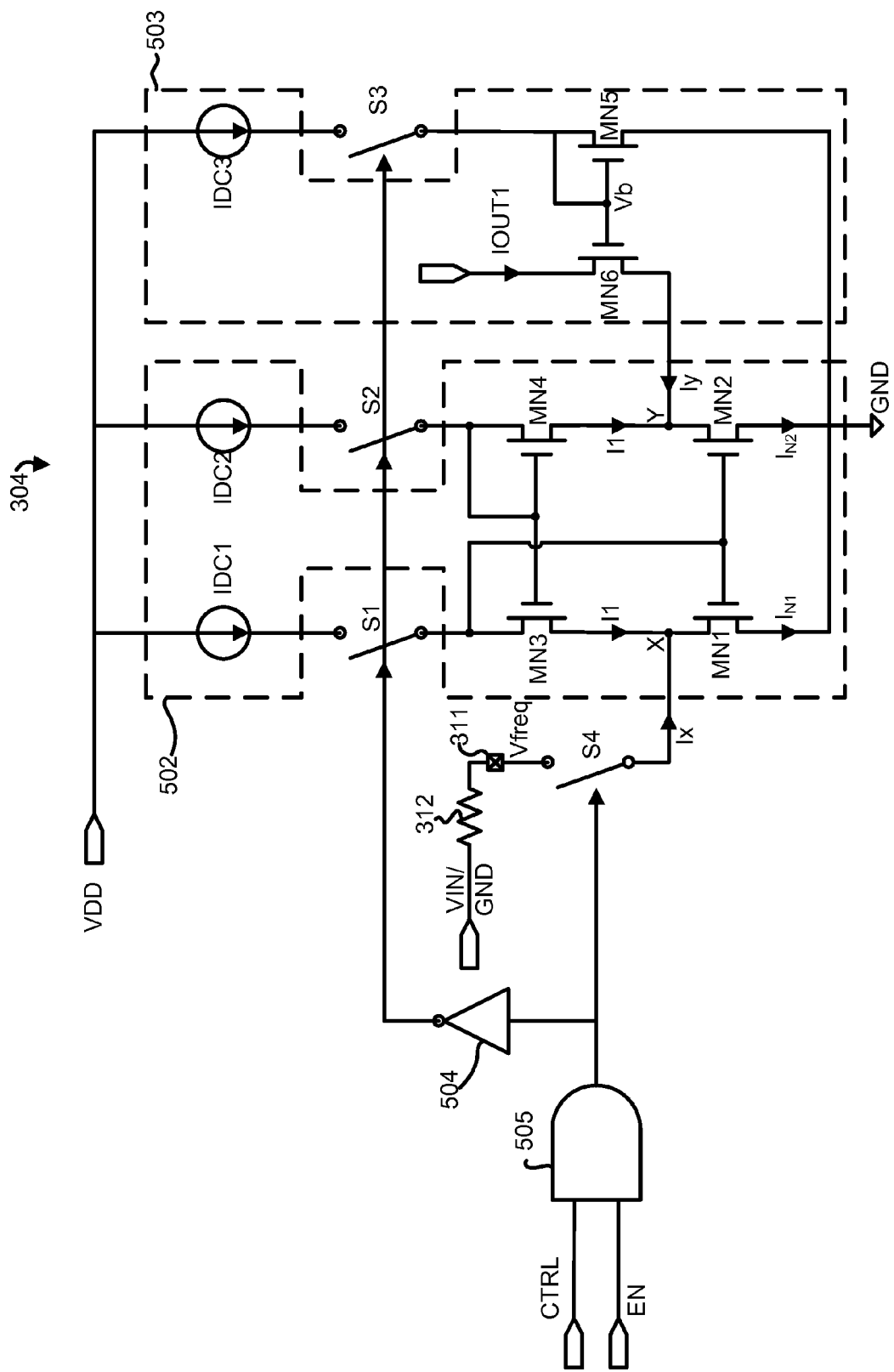
FIG. 5 illustrates a schematic circuit diagram of the first current source 304 according to an embodiment of the present invention.

FIG. 5 illustrates a schematic circuit diagram of the first current source 304 according to an embodiment of the present invention. As shown in FIG. 5, the first current source comprises a switch array, a main current mirror 502, and a bias setting circuit 503. The switch array may comprise a plurality of switches S1, S2, S3 and S4 for controlling the main current mirror 502 and the bias setting circuit 503 powered on and off, wherein the logic control signal CTRL and the enable signal EN together determine the plurality of switches ON and OFF. The main current mirror has a node X and a node Y in symmetry, wherein the node X is coupled to the multi-functional pin 311, and the node Y is coupled to the bias setting circuit 503. When the main current mirror 502 is in operation, the bias setting circuit 503 generates a bias voltage Vb on the node Y. The bias voltage Vb is mirrored to the node X to replace the initial value of the frequency signal Vfreq. As a result, a current Ix through the multi-functional pin 311 which is proportional to the input voltage VIN is generated on the node X. The current signal Ix is mirrored to node Y as the first output current IOUT1.

In the illustrated embodiment, the switch array comprises 4 switches S1, S2, S3 and S4. In other embodiments, the switch array may comprise a random number of switches. The main current mirror is a voltage cascaded current mirror, comprising a first NMOS transistor MN1, a second NMOS transistor MN2, a third NMOS transistor MN3, a fourth NMOS transistor MN4, a first direct current (DC) source IDC1, and a second DC source IDC2.

Thereinto, a source electrode of the first NMOS transistor MN1 is connected to the system reference ground, and a drain electrode of the first NMOS transistor MN1 serves as the node X. A source electrode of the second NMOS transistor MN2 is connected to the system reference ground GND, and a drain electrode of the second NMOS transistor MN2 serves as the node Y. A source electrode of the third NMOS transistor MN3 is coupled to the drain electrode of the first NMOS transistor MN1, and a drain electrode of the third NMOS transistor MN3 is coupled to gate electrodes of the first NMOS transistor MN1 and the second NMOS transistor MN2. A source electrode of the fourth NMOS transistor MN4 coupled to the drain electrode of the second NMOS transistor MN2, and a drain electrode of the fourth NMOS transistor MN4 is coupled to gate electrodes of the third NMOS transistor MN3 and the fourth NMOS transistor MN4. The first DC current source IDC1 is coupled between a system power supply voltage VDD and the drain electrode of the third NMOS transistor MN3. The second DC current source IDC2 is coupled between the system power supply voltage VDD and the drain electrode of the fourth NMOS transistor MN4.

In one embodiment, the first switch S1 of the switch array is coupled between the first DC current source IDC1 and the third NMOS transistor MN3, and the second switch S2 is coupled between the second DC current source IDC2 and the fourth NMOS transistor MN4. In one embodiment, the output currents of the first DC current source IDC1 and the second DC current source IDC2 are equal to each other.

In the illustrated embodiment, the bias setting circuit 503 comprises a third DC source IDC3, a fifth NMOS transistor MN5 and a sixth NMOS transistor MN6.

A source electrode of the fifth NMOS transistor MN5 is connected to the system reference ground GND, and a drain electrode of the fifth NMOS transistor MN5 is coupled to a gate electrode of the fifth NMOS transistor MN5. A source electrode of the sixth NMOS transistor MN6 is coupled to the node Y, and a gate electrode of the sixth NMOS transistor MN6 coupled to the gate electrode of the fifth NMOS electrode MN5. The first output current IOUT1 is generated on a drain electrode of the sixth NMOS transistor MN6. The third DC current source IDC3 is coupled between the system power supply voltage VDD and the drain electrode of the fifth NMOS transistor MN5.

In certain embodiment, the switches S1-S4 are MOSFETs. For example, in one embodiment, the switches S1-S3 are PMOS transistors. The logic control signal CTRL and the enable signal EN are respectively provided to two input terminals of an AND gate 505. The AND gate 505 generates a switch array control signal. The switch array control signal is received by the switches S1-S3 via an inverter 504. The switch S4 is a NMOS transistor, and receives the switch array control signal directly. In other embodiments, the switches S1-S4 may be other suitable device or circuit well known by the ordinary skilled artisan.

The following description takes the circuit structure shown in FIG. 5 as an example to interpret the operational principle of the first current source 304. One with ordinary skill in the art should understand that such description is for illustrative purpose but not intended to limit the present invention.

For better understanding, it is assumed that NMOS transistors MN1-MN4 are the same devices, and the first DC source IDC1 and the second DC current source IDC2 have the same output current I1. However, one with ordinary skill in the art could understand that in other embodiments, some device parameters, e.g. the ratio of channel length versus width, may vary from transistors MN1-MN4. And the output currents of the first DC source IDC1 and the second current DC source IDC2 may also be different.

If the logic control signal CTRL and the enable signal EN are both at high level, the first current source 304 is in operation. At this time, switches S1, S2, S3 and S4 are all turned on, to make the main current mirror 502 and the bias setting circuit 503 in operation. Once either the enable signal EN or the logic control signal CTRL is at low level, the switches S1, S2, S3 and S4 are all turned off, to completely shut down the main current mirror 502 and the bias setting circuit 503, and thus there is no energy consumption.

When the first current source 304 is in operation, the drain electrode of the fifth NMOS transistor MN5 in bias setting circuit 503 generates the bias voltage Vb. The voltage level on the node Y is Vb−VGSN6, where VGSN6 is the gate-source voltage of the sixth NMOS transistor MN6. As the device parameters of MN1-MN4 are the same, the voltage level on the node Y is equal to the voltage level on the node X, and consequently the frequency signal Vfreq=Vb−VGSN6. Hereupon, the current Ix through the node X is Ix=[VIN−(Vb−VGSN6)]/R, and the current direction is from multi-functional pin 311 to the node X, where R is the resistance of the first resistor 312. Meanwhile, a current IN1 through the first NMOS transistor MN1 is equal to the sum of the current Ix plus the output current of the first DC current source IDC1, i.e. Ix+I1=IN1. Since MN1 and MN2 are the same devices, a current IN2 through the second NMOS transistor MN2 is equal to IN1, and according to the above assumption, the output current of the second DC current source IDC2 is also equal to I1. As a result, a current Iy through the node Y, i.e. the first output current IOUT1=Iy=IN2−Id=IN1−I1=Ix.

Eventually, IOUT1=Iy=Ix=[VIN−(Vb−VGSN6)]/R, i.e. the first output current IOUT1 is proportional to the input voltage VIN.

One with ordinary skill in the art could understand that in other embodiment, the first current source 304 may have different circuit structure or device parameter to perform the function that the first output current IOUT1 is proportional to the input voltage VIN. For example, in one embodiment, the first current source 304 may further comprise an associate current mirror (not shown in FIG. 5) coupled to the drain electrode of the sixth NMOS transistor MN6, configured to covert the first output current IOUT1 from a sinking current output to a sourcing current output. In another embodiment, the third DC current source IDC3 and the fifth NMOS transistor MN5 in the bias setting circuit 503 may be replaced by a voltage source. In yet another embodiment, the main current mirror 502 may be consisted of bipolar junction transistors (BJT).

Figure 6:
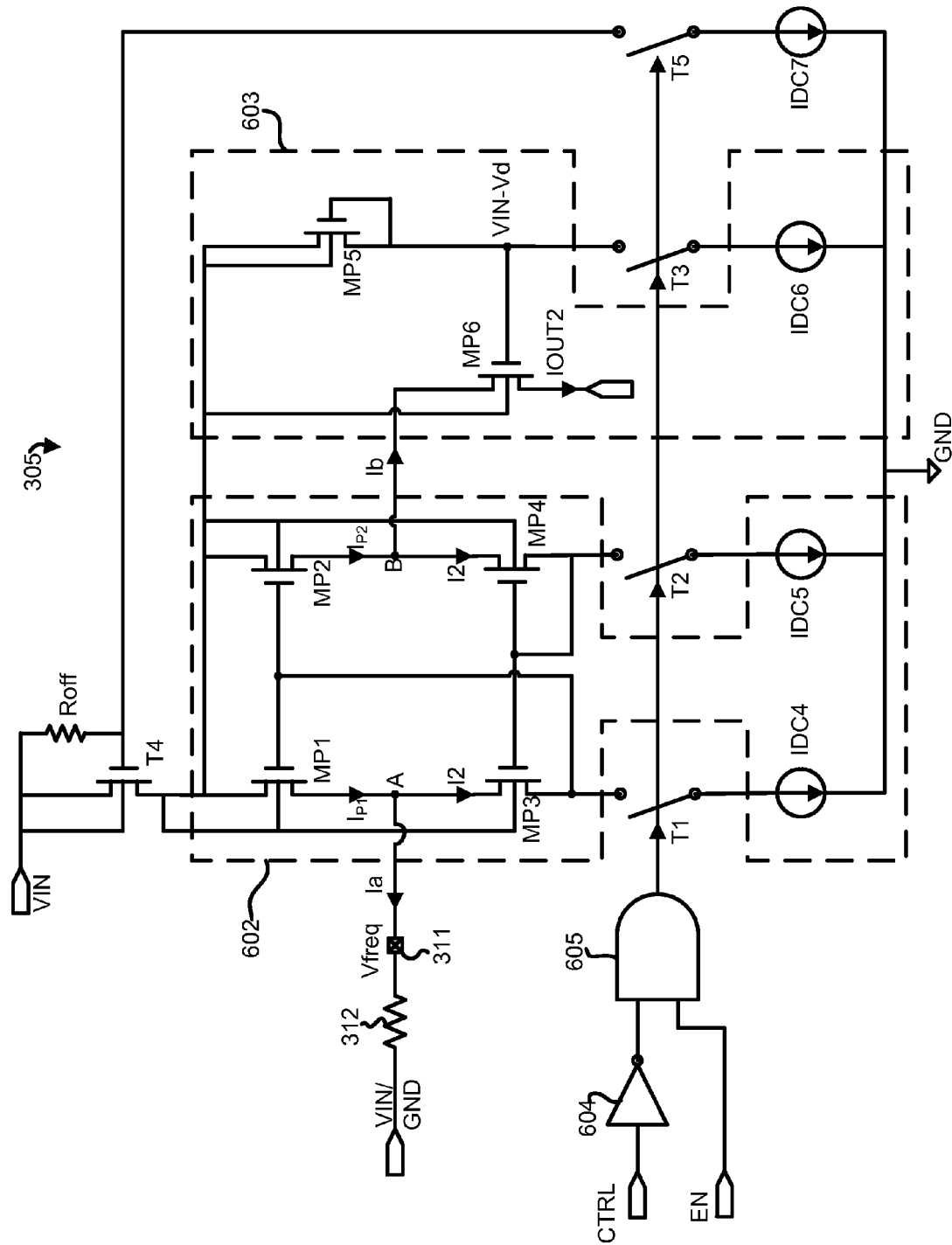
FIG. 6 illustrates a schematic circuit diagram of the second current source 305 according to an embodiment of the present invention.

FIG. 6 illustrates a schematic circuit diagram of the second current source 305 according to an embodiment of the present invention. In the illustrated embodiment, the second current source 305 comprises a switch array, a main current mirror 602 and a bias setting circuit 603. The switch array comprises 5 switches T1, T2, T3, T4, and T5, configured to control the main current mirror 602 and the bias setting circuit 603 powered on and off, wherein the switches T1, T2, T3, T4 and T5 are controlled according to the logic control signal CTRL and the enable signal EN.

The main current mirror 602 has a node A and a node B in symmetry, wherein the node A is coupled to the multi-functional pin 311, and wherein the node B is coupled to the bias setting circuit 603. When the main current mirror 602 is in operation, the bias setting circuit 603 generates a bias voltage VIN–Vd on the node B. The bias voltage VIN–Vd is then mirrored to the node B to replace the initial value of the frequency signal Vfreq, As a result, a current Ia through the multi-functional pin 311 which is proportional to the input voltage VIN is generated on the node A. The current signal Ia is mirrored to node B as the first output current IOUT2.

In the illustrated embodiment, the switch T5 comprises a first terminal, a second terminal and a control terminal. The first terminal of T5 receives the input voltage VIN. The main current mirror 602 is a voltage cascaded current mirror, comprising a first PMOS transistor MP1, a second PMOS transistor MP2, a third PMOS transistor MP3, a fourth PMOS transistor MP4, a fourth DC current source IDC4 and a fifth DC current source IDC5. A source electrode of the first PMOS transistor MP1 is coupled to the input voltage VIN, and a drain electrode of the first PMOS transistor MP1 serves as the node A. A source electrode of the second PMOS transistor MP2 is coupled to the input voltage VIN, and a drain electrode of the second NMOS transistor MP2 serves as the second node B. A source electrode of the third PMOS transistor MP3 is coupled to the drain electrode of the first PMOS transistor MP1 and a drain electrode of the third PMOS transistor is coupled to gate electrodes of the first PMOS transistor MP1 and the second PMOS transistor MP2. A source electrode of the fourth PMOS transistor MP4 is coupled to the drain electrode of the second PMOS transistor MP2, and a drain electrode of the fourth PMOS transistor MP4 is coupled to gate electrodes of the third PMOS transistor MP3 and the fourth PMOS transistor MP4. The fourth DC current source IDC4 is coupled between the system reference ground GND and the drain electrode of the third PMOS transistor MP3. The fifth DC current source IDC5 is coupled between the system reference ground GND and the drain electrode of the fourth PMOS transistor MP4.

In one embodiment, the switch T1 is further coupled between the fourth DC source IDC4 and the third PMOS transistor MP3. The switch T2 is further coupled between the fifth DC source IDC5 and the fourth PMOS transistor MP4. In one embodiment, the output currents of the fourth DC current source IDC4 and the fifth DC current source IDC5 are equal to each other.

In the illustrated embodiment, the bias setting circuit 603 comprises a sixth DC current source IDC6, a fifth PMOS transistor MP5 and a sixth PMOS transistor MP6. A source electrode of the fifth PMOS transistor MP5 is coupled to the input voltage VIN, and a drain electrode of the fifth PMOS transistor MP5 is coupled to a gate electrode of the fifth PMOS transistor MP5. A source electrode of the sixth PMOS transistor MP6 is coupled to the node B, and a gate electrode of the sixth PMOS transistor is coupled to the gate electrode of the fifth PMOS electrode MP5. A drain electrode of the sixth PMOS transistor MP6 provides the second output current IOUT2. The sixth DC current source IDC6 is coupled between the system reference ground GND and the drain electrode of the fifth PMOS transistor MP5.

In one embodiment, the third switch T3 is further coupled between the sixth DC current source IDC6 and the fifth PMOS transistor MP5. The fourth switch T4 is coupled to the input voltage VIN with one terminal, and coupled to the source electrodes of the first PMOS transistor MP1, the second PMOS transistor MP2, and the fifth PMOS transistor MP5 with the other terminal. In one embodiment, output currents of the sixth DC current source IDC6, the fourth DC current source IDC4 and the fifth current DC source IDC5 are equal to each other. In other embodiment, the output current of the sixth DC current source IDC6 may be different from either the output current of fourth DC current source IDC4 or the output current of the fifth DC current source IDC5.

In the illustrated embodiment, the fourth switch T4 is a PMOS transistor. A drain electrode of the switch T4 is coupled to the input voltage VIN, and body electrodes of PMOS transistors MP1-MP6 are all coupled to a source electrode of the switch T4. The second current source 305 further comprises a seventh DC current source IDC7 and a cut-off resistor Roff, wherein the fifth switch T5 is coupled to a gate electrode of the fourth switch T4 with one terminal. The seventh DC current source IDC7 is coupled between the other terminal of the fifth switch T5 and the system reference ground GND. The cut-off resistor Roff is coupled between the gate electrode of the fourth switch T4 and the input voltage VIN.

In certain embodiments, the switches T1, T2, T3, and T5 are also MOSFETs. In one embodiment, the second current source 305 further comprises an AND gate 605, having a first input terminal, a second input terminal and an output terminal. The logic control signal CTRL is provided to the first input terminal of the AND gate 605 via an inverter 604. The enable signal EN is provided to the second input terminal of the AND gate 605. The output terminal of the AND gate 605 provides a switch array signal. The switches T1, T2, T3, and T5 may be NMOS transistors and receive the switch array signal with their gate electrodes. In other embodiment, the switches T1, T2, T3, and T5 may be any suitable circuits or devices well known by ordinary skilled artisan.

Hereinafter, the operational principle of the second current source 305 is described according to the circuit structure shown in FIG. 6. One with ordinary skill in the art should understand that these descriptions are for illustrative purpose and there is no intention to limit the scope of the present invention.

For better understanding, it is assumed that the device parameter of the PMOS transistors MP1-MP4 are the same, and both the output currents of the DC current sources IDC4 and IDC5 are equal to I2. One with ordinary skill in the art should further understand that in other embodiments, the device parameter of PMOS transistors MP1-MP4, for example, the ratio of channel length versus width, may vary from one another. The output currents of the DC current sources IDC4 and IDC5 may also be different from one another.

If the logic control signal CTRL is at low level, and the enable signal EN is at high level, the second current source 305 is in operation. Hereupon, the switches T1, T2, T3 and T5 are turned on. As the switch T5 is turned on, current flows through the cut-off resistor Roff and thus a voltage drop is generated on Roff to turn on the switch T4. Then, the main current mirror 602 and the bias setting circuit 603 are in operation. Once the enable signal EN is turned to low level, or the logic control signal CTRL is at high level, the switches T1, T2, T3, and T5 are all turned off. After then, the switch T4 is also turned off since no current flows through the cut-off resistor Roff. Consequently, both the main current mirror 602 and the bias setting circuit 603 are completely shut down, and there is no more energy consumption.

When the second current source 305 is in operation, the switches T4 and T5 are turned on. Current flows through the fifth PMOS transistor MP5, and pulls up the voltage level on the source electrode of the fifth PMOS transistor MP5 to input voltage VIN. And a bias voltage is provided to the drain electrode of the fifth PMOS transistor MP5. The bias voltage is equal to VIN−Vd, wherein Vd is a source-drain voltage of the fifth PMOS transistor MP5. This bias voltage generates a negative gate-source voltage VGSP6 on the sixth PMOS transistor MP6, and then the sixth PMOS transistor MP6 is turned on. After that, the voltage level of the node B is VIN−Vd−VGSP6. Since transistors MP1-MP4 are the same devices, the voltage level on the node A is equal to the voltage level on the node B. The frequency signal Vfreq=VIN−Vd−VGSP6. Meanwhile, the multi-functional pin 311 is coupled to the system reference ground GND via the first resistor 312, a node current Ia flows through the multi-functional pin 311. Ia=(VIN−Vd−VGSP6)/R, wherein R is the resistance of the first resistor 312. A current IP1 through the transistor MP1 is equal to the node current Ia plus the output current of the fourth DC current source IDC4, i.e. Ia+I2=IP1. Because MP1-MP4 are the same devices, the current IP2 through the transistor MP2 is equal to the current IP1. Moreover, the output current of the fifth DC current source IDC5 is also equal to I2. Accordingly, a node current Ib on the node B, i.e. the output current IOUT2=Ib=Ip2−I2=Ip1−I2=Ia.

Eventually, IOUT2=Ib=Ia=(VIN−Vb−VGSP6)/R, which means that the second output current IOUT2 is proportional to the input voltage VIN.

One with ordinary skill in the art should understand that in other embodiments, the second current source 305 may have different circuit structure or device parameter to perform that the second output current IOUT2 is proportional to the input voltage VIN. For example, in one embodiment, the sixth DC current source IDC6 and the fifth PMOS transistor MP5 may be replaced by a voltage source. In another embodiment, the main current mirror 602 may consist of BJT device.

One with ordinary skill in the art should further understand that in certain embodiments, the second current source 305 shown in FIG. 6 could be exchanged with the first current source 304. In one embodiment, the logic control signal CTRL may be directly provided to the AND gate 605 without inverted by the inverter 604.

Figure 7:
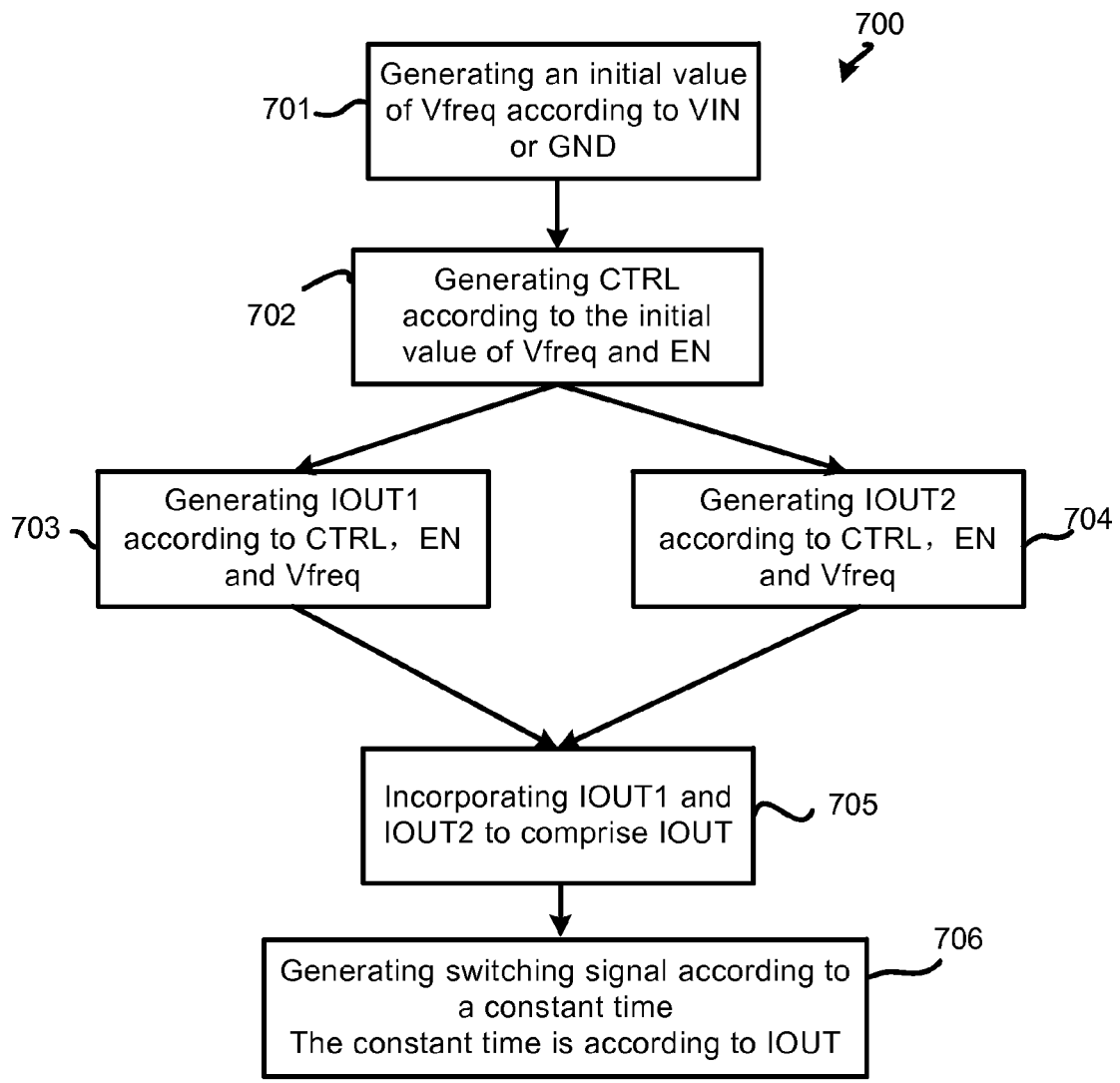
FIG. 7 illustrates a process flow diagram of a method 700 for controlling a switch mode power supply according to an embodiment of the present invention.

FIG. 7 illustrates a process flow diagram of a method 700 for controlling a switch mode power supply according to an embodiment of the present invention. As shown in FIG. 7, the control method 700 comprises steps 701-705:

Step 701: generating an initial value of a frequency signal Vfreq according to an input voltage VIN or a zero voltage on a system reference ground GND;

Step 702: generating a logic control signal CTRL according to the initial value of the frequency signal and an enable signal EN, wherein the logic control signal CTRL is configured to indicate either of two operational modes of the switch mode power supply;

Step 703: generating a first output current IOUT1 according to the logic control signal CTRL, the enable signal EN and the frequency signal Vfreq;

Step 704: generating a second output current IOUT2 according to the logic control signal CTRL, the enable signal EN and the frequency signal Vfreq; and Step 705: incorporating the first output current IOUT1 with the second output current IOUT2 to comprise a charging current IOUT, wherein the charging current IOUT is proportional to the input voltage VIN.

In one embodiment, the control method further comprises step 706: applying constant time control method to generate a switching signal to control the switch-mode power supply by means of a constant time, wherein the constant time is generated according to the charging current.

In one embodiment, the enable signal EN may be in an enable state or a disable state. When the enable signal EN is in the enable state, if the initial value of the frequency signal Vfreq is generated according to the input voltage VIN, the first output current IOUT1 is proportional to the input voltage VIN, and the second output current IOUT2 is zero. if the initial value of the frequency signal Vfreq is generated according to the zero voltage on system reference ground GND, the first output current IOUT1 is zero and the second output current IOUT2 is proportional to the input voltage VIN. In another embodiment, if the initial value of the frequency signal Vfreq is generated according to the input voltage VIN, a predetermined bias voltage Vb replaces the initial value as the frequency signal Vfreq in steps 703 and 704. If the initial value of the frequency signal Vfreq is generated according to the zero voltage on the system reference ground GND, a predetermined bias voltage VIN−Vd replaces the initial value as the frequency signal Vfreq in steps 703 and 704.

In one embodiment, the logic control signal CTRL in step 702 indicates the switch mode power supply to operate under either forced-continuous-conduction mode (FCCM) or discontinuous-conduction mode (DCM).

In another embodiment, the enable signal EN may be in an enable state or a disable state. When the enable signal EN is in the enable state, if the initial value of the frequency signal Vfreq is generated according to the input voltage VIN, the control signal CTRL is at high level. While if the initial value of the frequency signal Vfreq is generated according to the zero voltage on the system reference ground GND, the control signal CTRL is at low level.

The above description and discussion about specific embodiments of the present invention is for purposes of illustration. However, one with ordinary skill in the relevant art should know that the invention is not limited by the specific examples disclosed herein. Variations and modifications can be made on the apparatus, methods and technical design described above. Accordingly, the invention should be viewed as limited solely by the scope and spirit of the appended claims.

I claim:

1. A switch-mode power supply comprising a converter, a controller and a charging current source, wherein the switch-mode power supply is configured to convert an input voltage to an output voltage, and wherein the charging current source comprises:

a multi-functional pin, coupled to the input voltage or a system reference ground via a first resistor, wherein the multi-functional pin outputs a frequency signal, and an initial value of the frequency signal is generated according to the input voltage or a zero voltage on the system reference ground;

a logic circuit coupled to the multi-functional pin, wherein the logic circuit generates a logic control signal according to the initial value of the frequency signal and an enable signal, and wherein the logic control signal is coupled to the controller configured to indicate either of two operation modes of the controller;

a first current source coupled to the logic circuit and the multi-functional pin, wherein the first current source generates a first output current according to the frequency signal, the enable signal and the logic control signal;

a second current source coupled to the logic circuit and the multi-functional pin, wherein the second current source generates a second output current according to the frequency signal, the enable signal and the logic control signal; and wherein the first output current is incorporated with the second output current to comprise a charging current provided to the controller, wherein the charging current is proportional to the input voltage.

2. The switch-mode power supply according to claim 1, wherein the controller comprises a timer, and wherein the two operational modes at least comprise a constant on time control mode, and further wherein the charging current is provided to the timer.

3. The switch-mode power supply according to claim 1, wherein the two operational modes comprise a forced-continuous-conduction mode and a discontinuous-conduction mode.

4. The switch-mode power supply according to claim 1, wherein when the enable signal is in an enable state,
   a) the second output current is zero if the multi-functional pin is coupled to the input voltage; or
   b) the first output current is zero if the multi-functional pin is coupled to the system reference ground.

5. The switch-mode power supply according to claim 1, wherein both the first current source and the second current source comprise:
   a bias setting circuit configured to generate a bias voltage;
   a main current mirror having a first node and a second node in symmetry, wherein the second node receives the bias voltage, and wherein the first node is coupled to the multi-functional pin, and wherein a current through the multi-functional pin is mirrored from the first node to the second node as the first output current or the second output current; and
   a switch array, comprising a plurality of switches, wherein the switches control the bias setting circuit and the main current mirror to be powered on and off according to the logic control signal and the enable signal.

6. The switch-mode power supply according to claim 5, in the first current source,
   the main current mirror comprising:
      a first NMOS transistor, a source electrode of the first NMOS transistor connected to the system reference ground, and a drain electrode of the first NMOS transistor being the first node;
      a second NMOS transistor, a source electrode of the second NMOS transistor connected to the system reference ground, and a drain electrode of the second NMOS transistor being the second node;
      a third NMOS transistor, a source electrode of the third NMOS transistor coupled to the drain electrode of the first NMOS transistor and a drain electrode of the third NMOS transistor coupled to gate electrodes of the first NMOS transistor and the second NMOS transistor;
      a fourth NMOS transistor, a source electrode of the fourth NMOS transistor coupled to the drain electrode of the second NMOS transistor, and a drain electrode of the fourth NMOS transistor coupled to gate electrodes of the third NMOS transistor and the fourth NMOS transistor;

a first DC current source coupled between a system power supply voltage and the drain electrode of the third NMOS transistor; and
   a second DC current source coupled between the system power supply voltage and the drain electrode of the fourth NMOS transistor; and
   the bias setting circuit comprising:
      a fifth NMOS transistor, a source electrode of the fifth NMOS transistor connected to the system reference ground, and a drain electrode of the fifth NMOS transistor coupled to a gate electrode of the fifth NMOS transistor;
      a sixth NMOS transistor, a source electrode of the sixth NMOS transistor coupled to the second node, a gate electrode of the sixth NMOS transistor coupled to the gate electrode of the fifth NMOS electrode, a drain electrode of the sixth NMOS transistor providing the first output current; and
      a third DC current source coupled between the system power supply voltage and the drain electrode of the fifth NMOS transistor.

7. The switch mode power supply according to claim 6, wherein the switch array at least comprises:
   a first switch coupled between the first DC current source and the third NMOS transistor;
   a second switch coupled between the second DC current source and the fourth NMOS transistor;
   a third switch coupled between the third DC current source and the fifth NMOS transistor; and
   a fourth switch coupled between the multi-functional pin and the first node.

8. The switch-mode power supply according to claim 7, wherein the first switch, the second switch and the third switch are PMOS transistors, and wherein the fourth switch is a NMOS transistor, the first current source further comprising:
   an AND gate, having two input terminals and an output terminal, wherein the two input terminals respectively receive the logic control signal and the enable signal, and wherein the output terminal of the AND gate is coupled to a gate electrode of the fourth switch; and
   an inverter, having an input terminal and an output terminal, wherein the input terminal is coupled to the output terminal of the AND gate, and wherein the output terminal is coupled to electrodes of the first switch, the second switch and the third switch.

9. The switch-mode power supply according to claim 6, wherein the first current source further comprises an associate current mirror coupled to the drain electrode of the sixth NMOS transistor configured to convert the first output current from a sinking current to a sourcing current.

10. The switch-mode power supply according to claim 5, in the second current source,
   the main current mirror comprising:
      a first PMOS transistor, a source electrode of the first PMOS transistor coupled to the input voltage, and a drain electrode of the first PMOS transistor being the first node;
      a second PMOS transistor, a source electrode of the second PMOS transistor coupled to the input voltage, and a drain electrode of the second NMOS transistor being the second node;
      a third PMOS transistor, a source electrode of the third PMOS transistor coupled to the drain electrode of the first PMOS transistor and a drain electrode of the third PMOS transistor coupled to gate electrodes of the first PMOS transistor and the second PMOS transistor;

a fourth PMOS transistor, a source electrode of the fourth PMOS transistor coupled to the drain electrode of the second PMOS transistor, and a drain electrode of the fourth PMOS transistor coupled to gate electrodes of the third PMOS transistor and the fourth PMOS transistor;

a fourth DC current source coupled between the system reference ground and the drain electrode of the third PMOS transistor; and a fifth DC current source coupled between the system reference ground and the drain electrode of the fourth PMOS transistor; and the bias setting circuit comprising:

a fifth PMOS transistor, a source electrode of the fifth PMOS transistor coupled to the input voltage, and a drain electrode of the fifth PMOS transistor coupled to a gate electrode of the fifth PMOS transistor;

a sixth PMOS transistor, a source electrode of the sixth PMOS transistor coupled to the second node, a gate electrode of the sixth PMOS transistor coupled to the gate electrode of the fifth PMOS electrode, a drain electrode of the sixth PMOS transistor providing the second output current; and a sixth DC current source coupled between the system reference ground and the drain electrode of the fifth PMOS transistor.

11. The switch-mode power supply according to claim 10, wherein the switch array comprises:

a first switch coupled between the third PMOS transistor and the fourth DC current source;

a second switch coupled between the fourth PMOS transistor and the fifth DC current source;

a third switch coupled between the fifth PMOS transistor and the sixth DC current source; and a fourth switch coupled to the input voltage with a first terminal, and coupled to the source electrodes of the first PMOS transistor, the second PMOS transistor and the fifth PMOS transistor with a second terminal.

12. The switch-mode power supply according to claim 11, wherein the first switch, the second switch and the third switch are NMOS transistors, and wherein the fourth switch is a PMOS transistor, and wherein the second current source further comprises:

a fifth switch, wherein the fifth switch is a NMOS transistor coupled to a gate electrode of the fourth switch with a drain electrode;

a seventh DC current source, coupled between a source electrode of the fifth switch and the system reference ground;

a cut-off resistor, coupled between the gate of the fourth switch and the input voltage;

an inverter, having an input terminal and an output terminal, wherein the input terminal of the inverter receives the logic control signal; and an AND gate, having two input terminals and an output terminal, wherein the two input terminals is respectively coupled to the output terminal of the inverter and the enable signal, and wherein the output terminal is coupled to gate electrodes of the first switch, the second switch, the third switch and the fifth switch.

13. The switch-mode power supply according to claim 1, wherein when the enable signal is in an enable state, (a) the logic control signal is at high level if the multi-functional pin is receives the input voltage; or (b) the logic control signal is at low level if the multi-functional pin is coupled to the system reference ground.

14. The switch-mode power supply according to claim 13, wherein the logic circuit comprises:

a logic switch having a first terminal, a second terminal and a control terminal, wherein the first terminal is coupled to the multi-functional pin;

a first inverter, having an input terminal and an output terminal, wherein the input terminal is coupled to the second terminal of the logic switch;

a second inverter, having an input terminal and an output terminal, wherein the input terminal is coupled to the output terminal of the first inverter;

a third inverter, having an input terminal and an output terminal, wherein the input terminal receives the enable signal;

a logic capacitor, coupled between the output terminal of the first inverter and the system reference ground;

a delay module, having an input terminal and an output terminal, wherein the input terminal receives the enable signal;

a D-type flip-flop, having a D input terminal, a clock input terminal, a reset terminal and a Q output terminal, the D input terminal coupled to the output terminal of the second inverter, the clock terminal coupled to the output terminal of the delay module, the reset terminal receiving the enable signal, and the Q output terminal providing the logic control signal; and a NOR gate, having two input terminal and an output terminal, wherein the two terminal are respectively coupled to the Q output terminal of the D-type flip-flop and the output terminal of the third inverter, and wherein the output terminal is coupled to the control terminal of the logic switch.

15. A charging current source, comprising:

a multi-functional pin, coupled to the input voltage or a system reference ground via a first resistor, wherein the multi-functional pin outputs a frequency signal, and an initial value of the frequency signal is generated according to the input voltage or a zero voltage on the system reference ground;

a logic circuit coupled to the multi-functional pin, wherein the logic circuit generates a logic control signal according to the initial value of the frequency signal and an enable signal, and wherein the logic control signal is coupled to the controller configured to choose either of two operation modes of a controller;

a first current source coupled to the logic circuit and the multi-functional pin, wherein the first current source generates a first output current according to the frequency signal, the enable signal and the logic control signal;

a second current source coupled to the logic circuit and the multi-functional pin, wherein the second current source generates a second output current according to the frequency signal, the enable signal and the logic control signal; and wherein the first output current is incorporated with the second output current to comprise a charging current provided to the controller, wherein the charging current is proportional to the input voltage.

16. A method for controlling a switch-mode power supply, comprising:

generating an initial value of a frequency signal according to an input voltage or a zero voltage on a system reference ground;

generating a logic control signal indicative of either of two operation modes of a controller according to the initial value of the frequency signal and an enable signal;

generating a first output current according to the logic control signal, the enable signal and the frequency signal;

generating a second output current according to the logic control signal, the enable signal and the frequency signal; and incorporating the first output current with the second output current to comprise a charging current, wherein the charging current is proportional to the input voltage.

17. The method for controlling the switch-mode power supply according to claim 16, further comprising generating a switching signal to control the switch-mode power supply by means of a constant time, wherein the constant time is generated according to the charging current.

18. The method for controlling the switch-mode power supply according to claim 16, wherein when the enable signal is in an enable state,
  (a) If the initial value of the frequency signal is generated according to the input voltage, the first output current is proportional to the input voltage, and the second output current is zero; or
  (b) If the initial value of the frequency signal is generated according to the zero voltage, the second output current is proportional to the input voltage, and the first output current is zero.

19. The method for controlling the switch-mode power supply according to claim 16, wherein the two operation modes comprise a forced-continuous-conduction mode and a discontinuous-conduction mode.

20. The method for controlling the switch-mode power supply according to claim 16, wherein the enable signal is in an enable state, and wherein:
  (a) If the initial value of the frequency signal is generated according to the input voltage, the logic control signal is at high level; or
  (b) If the initial value of the frequency signal is generated according to the zero voltage, the logic control signal is at low level.

* * * * *